US010817424B1

United States Patent
Amrani et al.

(10) Patent No.: US 10,817,424 B1
(45) Date of Patent: Oct. 27, 2020

(54) USING POST-CACHE EDGE COMPUTING TO RE-POPULATE DYNAMIC CONTENT IN CACHED CONTENT

(71) Applicant: CLOUDFLARE, INC., San Francisco, CA (US)

(72) Inventors: Aleksander Amrani, Lisbon (PT); Andrew Taylor Plunk, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/723,639

(22) Filed: Dec. 20, 2019

(51) Int. Cl.
*G06F 12/0813* (2016.01)
*H04L 12/911* (2013.01)
*G06F 12/0891* (2016.01)

(52) U.S. Cl.
CPC ...... *G06F 12/0813* (2013.01); *G06F 12/0891* (2013.01); *H04L 47/783* (2013.01); *G06F 2212/622* (2013.01)

(58) Field of Classification Search
CPC ............. G06F 12/0813; G06F 12/0891; G06F 2212/622; G06F 21/10; G06F 12/0815; H04L 47/783; H04L 67/2842; H04L 67/02; H04L 67/1097; H04L 61/1511
See application file for complete search history.

(56) References Cited

U.S. PATENT DOCUMENTS

| | | | |
|---|---|---|---|
| 6,553,464 B1 * | 4/2003 | Kamvysselis | H04L 29/06 709/217 |
| 7,240,100 B1 | 7/2007 | Wein et al. | |
| 9,021,478 B1 | 4/2015 | Wan et al. | |
| 10,103,989 B2 | 10/2018 | Wood | |
| 10,341,431 B2 | 7/2019 | Finlow-Bates | |
| 2008/0028170 A1 * | 1/2008 | Clinick | G06Q 30/06 711/162 |
| 2009/0006736 A1 * | 1/2009 | Pantos | G06F 12/121 711/113 |
| 2009/0210526 A1 | 8/2009 | Howell et al. | |
| 2009/0216903 A1 | 8/2009 | Howell et al. | |
| 2010/0125916 A1 | 5/2010 | Choi et al. | |
| 2011/0107083 A1 | 5/2011 | Nomura et al. | |
| 2012/0124372 A1 | 5/2012 | Dilley et al. | |
| 2016/0043960 A1 | 2/2016 | Solis | |

(Continued)

OTHER PUBLICATIONS

Non-Final Office Action, U.S. Appl. No. 161375,664, dated Jun. 24, 2019, 11 pages.

(Continued)

*Primary Examiner* — Michael Krofcheck
(74) *Attorney, Agent, or Firm* — NDWE, LLP (57) ABSTRACT

A method that receives, at a first compute server of a plurality of compute servers, a request from a client device, wherein the request is a request for a network resource. The method locates at least one content item in response to the request for the network resource, detects possible dynamic content in the at least one content item, compares a first dynamic value in a first copy of the at least one content item to a second dynamic value in a second copy of the at least one content item from an origin server, and stores the at least one content item in a local cache as a safe content item to be returned for subsequent requests of the at least one content item in response to the first dynamic value matching the second dynamic value.

21 Claims, 6 Drawing Sheets

(56) References Cited

U.S. PATENT DOCUMENTS

| | | |
|---|---|---|
| 2016/0360012 A1* | 12/2016 | Zholudev ................ H04L 67/42 |
| 2016/0373543 A1* | 12/2016 | Alla .................... H04L 67/2804 |
| 2017/0163616 A1 | 6/2017 | Smith et al. |
| 2017/0257383 A1 | 9/2017 | Ficarra |
| 2017/0257904 A1 | 9/2017 | Mildh et al. |
| 2018/0013666 A1 | 1/2018 | Wood et al. |
| 2018/0137062 A1 | 5/2018 | Awad et al. |
| 2018/0189528 A1 | 7/2018 | Hanis et al. |
| 2018/0198764 A1 | 7/2018 | Kumar et al. |
| 2019/0081797 A1 | 3/2019 | Bos et al. |
| 2019/0103970 A1 | 4/2019 | Koszek |
| 2019/0197130 A1 | 6/2019 | Huang et al. |

OTHER PUBLICATIONS

Notice of Allowance, U.S. Appl. No. 16/375,664, dated Oct. 25, 2019, 9 pages.

* cited by examiner

```
CONTENT ITEM

<HTML>
<meta http-equiv="Content-Security-Policy" content="default-src 'self'; child-src 'none'; object-src 'none'">

Content-Security-Policy: script-src 'nonce-N1D2W3E4asdfgiBydWxIcyA7KQ'

<script nonce=N1D2W3E4asdfgiBydWxIcyA7KQ> var user = lookup 'username' </script>

<script nonce=N1D2W3E4asdfgiBydWxIcyA7KQ
 var account = lookup accountinfo (user)> </script>

<Body>
<p>"Hi!" user </p>

<p>"Your Accounts are as follows"</P
<table>account</table>

</Body>

</HTML>
```

ISOLATED EXECUTION
ENVRIONMENT MODEL

FIG. 5

VIRTUAL MACHINE
MODEL

USING POST-CACHE EDGE COMPUTING TO RE-POPULATE DYNAMIC CONTENT IN CACHED CONTENT

FIELD

Embodiments of the invention relate to the field of network computing; and more specifically, to a distributed cloud computing platform that manages the utilization of dynamic content values in cached content items and responses from origin servers at proxy servers in the distributed cloud computing network.

BACKGROUND

Historically, the use of web application code has been split between origin servers and browsers that are connected to one another by a network that transmits data from point to point. Initially, large websites and web applications were first run on large physical mainframe servers that could handle large traffic loads and large data transfers. Over time a switch was made to provide websites and web applications on tens to hundreds of commodity servers that allowed for a reduction in cost, more fault tolerance, and increased performance. This technology is referred to as cloud computing. The technology for providing web applications further evolved to utilize virtual machines where one physical machine could be split into multiple virtual machines that can be independently managed. Virtual machines typically have a high overhead cost in terms of compute resources. For instance, each virtual machine is typically allocated hundreds of megabytes of random-access memory (RAM) and typically takes tens of seconds to boot. Virtual containers can be used to provide isolation between customers of the cloud computing platform and are less resource intensive than virtual machines. However, web application code running in a container typically is run in its own OS-level process, consuming RAM, and inducing context-switching overhead. While native code can load quickly in a container, many server-oriented language execution environments are not optimized for startup time.

Some cloud computing platforms instantiate a containerized process for customer code and auto-scale the process which creates cold-starts. A cold-start occurs when a new copy of the code starts on a physical machine. When a new containerized process is instantiated it can take between hundreds of milliseconds to multiple seconds (e.g., between 500 ms to 10 seconds) to complete. This means that any request to be serviced by the code to be executed in a container may be waiting for as much time as it takes to start execution of the new containerized process (e.g., for as much as ten seconds). Also, this containerized process can only process a single request at a time and a new containerized process must be cold-started each time an additional concurrent request is received. This means that each such request to be serviced by a new container can experience significant lag that does not improve over time. If the containerized process does not receive a request to be processed within a certain amount of time, it will automatically terminate and a new containerized process will need to be cold-started again once a request is received. When new customer code is deployed, this entire process proceeds again as each containerized process needs to be instantiated anew.

In these complex cloud computing platforms, many different types of content can be managed and served, which creates both security and load management issues. In some cases, content items are locally cached to avoid having to request the content items from an origin server. However, in some cases the content items include dynamic content that is generated by the origin server and which varies with each request for the same content item. In this case, locally caching the content item with dynamic content is not possible because the dynamic content will be inaccurate or stale when subsequently requested. As a result, content items with dynamic content cannot be locally cached or provide inaccurate information to client devices causing these content items to have greater latency when requested.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus that provides a dynamic content generator in a distributed cloud computing network is described. The distributed cloud computing network includes multiple compute servers that are geographically distributed (e.g., in different locations throughout the world). There may be hundreds of compute servers that are geographically distributed in different points-of-presences (PoPs). Each PoP may include one or more physical servers (e.g., one or more compute servers, one or more control servers, one or more domain name system (DNS) servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) including content caching that is managed by a dynamic content manager that is executed at the compute servers.

The dynamic content manager is executed as a code at the PoP to inspect the responses being returned to client devices at the PoP. The dynamic content manager examines the network resources associated with responses including the content items (e.g., web pages, scripts, images and similar content items) that make up these network resources to identify content items that contain dynamic content, which the dynamic content manager manages by replacing or updating dynamic values and preventing content items with stale values to be returned in responses. The dynamic content can include any number and variety of dynamic values. A dynamic value changes with each response and is normally generated or determined by the origin server. The dynamic content can include scripts, images, text, metadata, and similar values that change on each request. Thus, when a proxy caches a content item with dynamic content, the subsequent requests for the content item serviced by the proxy server would be invalid if the last copy of the content item is cached locally and returned to service a request.

An example of dynamic content is nonce values. Nonce values are pseudo-random 'numbers used once.' The nonce values are used in content items like scripts and html code to identify non-malicious or trusted content. Nonce values are utilized in connection with various security features such as content security policies (CSP). The nonce value in a content item is expected to have been generated at an origin server and can occur at multiple locations in the content item. If a hacker has attempted to inject code such as a script into a content item, then the malicious script can be identified because it will not have a matching nonce value since the hacker cannot predict what the matching nonce value will be to utilize in the malicious script. The malicious script can then be blocked from execution.

However, the use of dynamic content (e.g., nonce values and the associated technologies like CSP) introduce inefficiencies in the distribution of the content items that utilize the dynamic content. Since the dynamic values are generated by an origin server specific to each request for a content item, local caching of the content item with the dynamic values cannot be utilized, because a locally cached copy would have an already utilized or stale dynamic value, which is not the intended response of the origin server developers and in some cases causes security issues that could be predicted by a hacker. The embodiments overcome this limitation by providing a dynamic content manager that is executed local to the cache, where the dynamic content manager identifies dynamic values in dynamic content and either updates them with new dynamic values such that the content item in the cache can be utilized with an updated dynamic value or determines that the content item must be requested from the origin server. The dynamic content manager is executed at a proxy server or similar edge device as deployed code.

Code deployed to the compute server (e.g., code written by or deployed by third-parties such as customers of the cloud computing platform or by first-parties such as the cloud computing platform manager) can be deployed to all or some of the compute servers of the distributed cloud computing network. The code can be, for example, a piece of JavaScript or other dynamically-typed language, a WebAssembly (WASM) compiled piece of code, or other compiled code. In an embodiment, the deployed code is compliant with the W3C standard ServiceWorker application programming interface (API). The deployed code can, for example, intercept and answer hypertext transfer protocol (HTTP) requests and make outgoing HTTP subrequests as part of answering an HTTP request. For purposes of this description, each piece of deployed code is referred to as a worker script and an executed instance of the worker script is referred to as a worker. According to some embodiments, the dynamic content manager is implemented as a worker script or a function of a worker script.

A worker script of a particular first-party or third-party is run in an execution environment in which a single process can safely run first-party or third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific example implementation, the worker script is run in an isolate of the V8 JavaScript engine.

Because a single process can run multiple isolated execution environments, the overhead of running the isolated execution environments is incurred once (e.g., starting the single process to run the isolated execution environments) and isolated execution environments can be started and run with very little individual overhead. The worker scripts are not executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like those experienced with other cloud computing platforms which means that more time is spent running the code instead of performing context switches. Also, because the implementations of the single process are shared between all isolated execution environments, the memory requirements are less than traditional cloud computing platforms.

In an embodiment, a particular dynamic content manager is loaded as a part of a worker script and executed on-demand (when and only if it is needed) at a particular compute server of the distributed cloud computing network. Each request for a content item that triggers handling of a response by a dynamic content manager is handled by the dynamic content manager at the compute server that is closest to the requesting client device. For instance, when responding to a client device in New Zealand, a dynamic content manager and worker script is run in a compute server in New Zealand that is closest to the client device. The compute server that receives the request may be determined by the network infrastructure according to an Anycast implementation or by a geographical load balancer.

Figure 1:
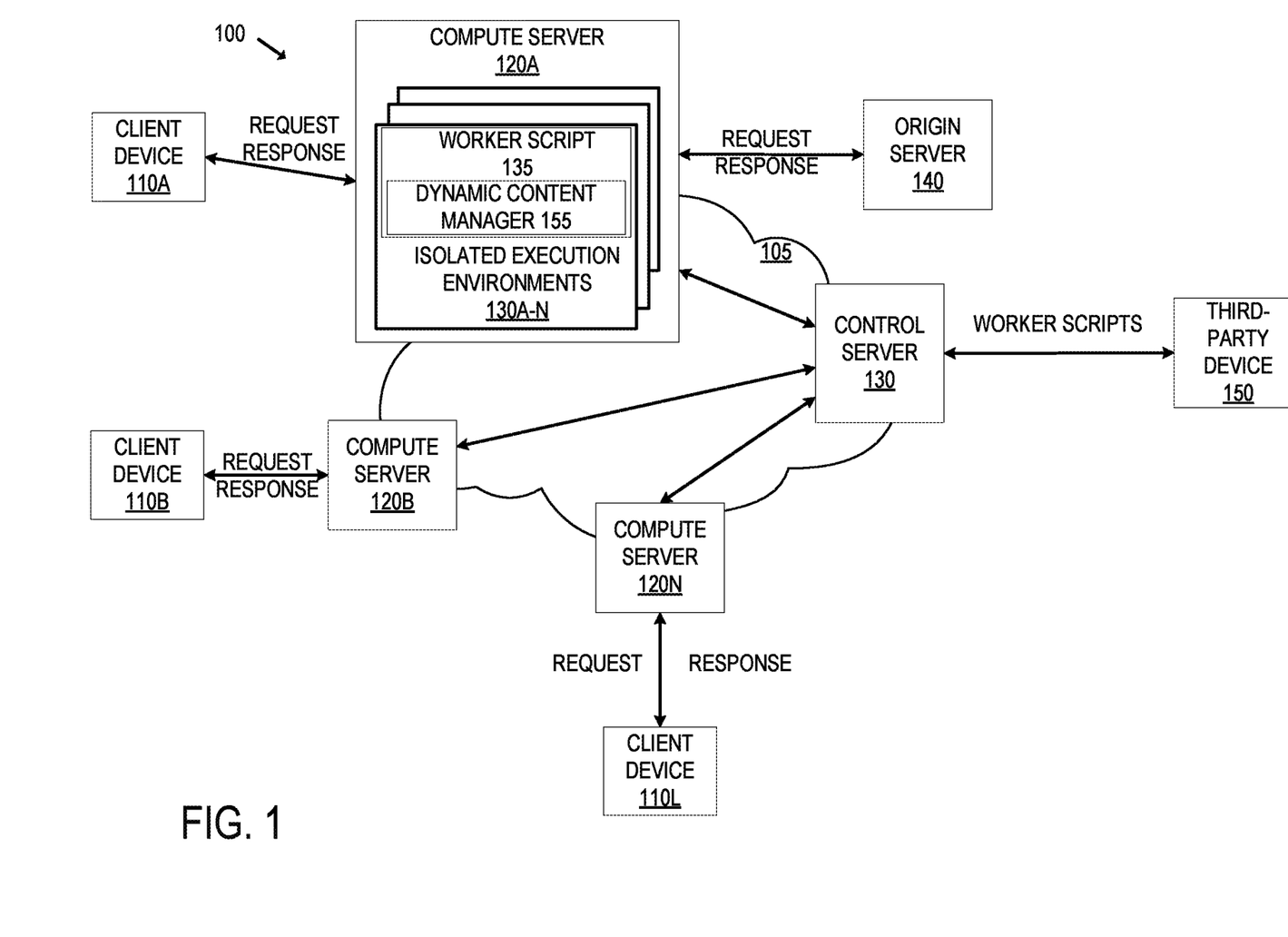
FIG. 1 illustrates an exemplary embodiment of a cloud computing platform that executes a dynamic content manager in a distributed cloud computing network according to an embodiment.

FIG. 1 illustrates an exemplary embodiment of a cloud computing platform that executes the dynamic content manager in a distributed cloud computing network according to an embodiment. The cloud computing platform can also provide different services in addition to the dynamic content manager such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110A-N, the compute servers 120A-N, the control server 130, the origin server 140, and the third-party device 150.

Each client device 110A-N is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the cloud computing platform. The compute servers 120A-N are physical servers and are geographically distributed (e.g., in different locations throughout the world). The compute servers 120A-N are part of the distributed cloud computing network 105. There may be hundreds of compute servers as part of the cloud computing platform. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices in the cloud computing network between the compute servers 120A-N such as routers, switches, and other intermediate computing devices.

The control server 130 is operated by the cloud computing platform and provides a set of tools and interfaces for a customer to, among other things, configure code to run in the cloud computing platform. For instance, the control server 130 may allow the customer to upload one or more worker scripts and may allow the customer to specify when the worker script(s) are to be run. For instance, the customer may configure a dynamic content manager 155 that identifies content items with dynamic values that are updated, replaced, or re-requested before being sent to the client device. By way of example, the control server 130 may allow the customer to configure a specific set of dynamic values that the dynamic content manager will search for in the responses from the origin server. A customer could also be allowed to configure which content items are allowed to have dynamic value updates and other aspects The control server 130 may allow the customer to delete and update previously uploaded dynamic content manager configurations or to modify the configuration of already uploaded dynamic content generator configurations. The control server can also provide tools to enable the customer to control the actions taken when a dynamic value is updated or replaced, such as logging or reporting the update or replacement.

The control server 130 deploys each dynamic content manager to each of the compute servers 120A-N automatically (without the customer selecting which of the compute servers 120A-N in which to deploy the worker script). In another embodiment, the control server 130 allows the customer to indicate which of the compute servers 120A-N are to be deployed a particular dynamic content manager or specific dynamic content manager configurations. The control server 130 creates an identifier for each dynamic content manager worker script. In an embodiment, the identifier is created by hashing the content of the dynamic content manager (e.g., using a cryptographic hash function such as SHA-256), where two scripts with identical content will have the same identifier even if uploaded by different customers and even if applied to different zones.

In an embodiment, the control server 130 allows a customer to provision the dynamic content managers to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers. Pointing the DNS or similar records to the compute server 120A enables the compute server to act as a proxy for requests directed to the origin server 140. In this manner, the requests for content items sent to the origin server and the responses thereto pass through the computer server and enable the dynamic content manager to examine the responses.

The third-party device 150 is a computing device (e.g., laptop, workstation, smartphone, mobile phone, tablet, etc.) that is used by third-parties to, among other things, configure their dynamic content manager 155 to run in the cloud computing platform. A third-party may be a customer of the cloud computing platform and/or a party that is configuring dynamic content manager code to run in the cloud computing platform on behalf of the customer.

The origin server 140, which may be owned or operated directly or indirectly by the customer of the cloud computing platform, is a computing device on which a network resource resides and/or originates (e.g., web pages, images, word processing documents, PDF files movie files, music files, or other content items). In an embodiment, the origin server 140 is not required to be in the cloud computing platform (e.g., nonce generator code may run on the compute servers without communicating with an origin server). Although FIG. 1 illustrates the origin server 140 communicating with the compute server 120A, the origin server 140 may also communicate with one or more of the other compute servers 120B-N. Similarly, while FIG. 1 illustrates a case with a single origin server, the cloud computing platform can service any number of origin servers each with separate dynamic content manager distributed to the compute servers.

The compute servers 120A-N are geographically distributed which decreases the distance between requesting client devices and the compute servers and decreases the time necessary to respond to a request. The compute servers 120A-N may operate as a reverse proxy and receive requests for network resources (e.g., HTTP requests) of a domain of the origin server 140. The particular compute server 120 that receives a request from a client device may be determined by the network infrastructure according to an anycast implementation or by a geographical load balancer. For instance, the compute servers 120A-N may have a same anycast Internet Protocol (IP) address for a domain of the origin server 140. If the origin server 140 handles the domain "example.com," a domain name service (DNS) request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A, the client device 110B is closest to the compute server 120B, and the client device 110L is closest to the compute server 120N. Accordingly, requests from the client device 110A are received at the compute server 120A, requests from the client device 110B are received at the compute server 120B, and requests from the client device 110L are received at the compute server 120N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute the worker script(s), which can be provided by a first or a third-party (e.g., as the dynamic content manager of customers). Each worker script is run in an isolated execution environment, such as running in an isolate of the V8 JavaScript engine. Thus, as illustrated in FIG. 1, the compute server 120A includes the isolated execution environments 130A-N that each executes a separate worker script 135. The isolated execution environment 130A-N are run within a single process. The worker scripts are not executed using a virtual machine or a container. In an embodiment, a particular worker script, e.g., a worker script implementing a dynamic content manager, is loaded and executed on-demand (when and only if it is needed) at a particular compute server of the distributed cloud computing network. Each request for a domain can trigger handling by a dynamic content manager and other worker scripts that will handle the request and response at the compute server that is closest to the requesting user.

The dynamic content manager 155 is a worker script or worker that is executed at the compute server to identify content items that have dynamic content and to determine whether the content items can be locally cached without providing stale or inaccurate dynamic content. The operation of the dynamic content manager is discussed herein below in further detail with reference to FIGS. 3 and 4. The dynamic content manager searches content items to be cached locally (or already cached locally) at a compute server or in proximity to the compute server. In some embodiments, the dynamic content manager also searches content items returned by an origin server as a response to a request for a network resource from a client device. When the dynamic content manager identifies a content item with a dynamic value, then the dynamic content manager can flag the content item to update or replace the dynamic value with a new dynamic value when servicing subsequent responses for the content item. In cases where the content items include dynamic content that cannot be updated locally, the dynamic content manager forces the subsequent requests to be serviced by the origin server.

In some embodiments, the updates to the dynamic value can be logged and in some cases cause a notification to be sent to an administrator or a customer (e.g., where the dynamic content manager is a third party code). The log can be maintained locally or at the control server and notifications can similarly be generated in response to log entry generation at the control server. In other embodiments, the log can be stored in any location accessible to the dynamic content manager in the cloud computing platform. Notifications can be sent by each dynamic content manager to the administrator or customer. In some embodiments, the notifications can be aggregated at the control server or similar location and sent in batches to the administrator or customer.

Figure 2:
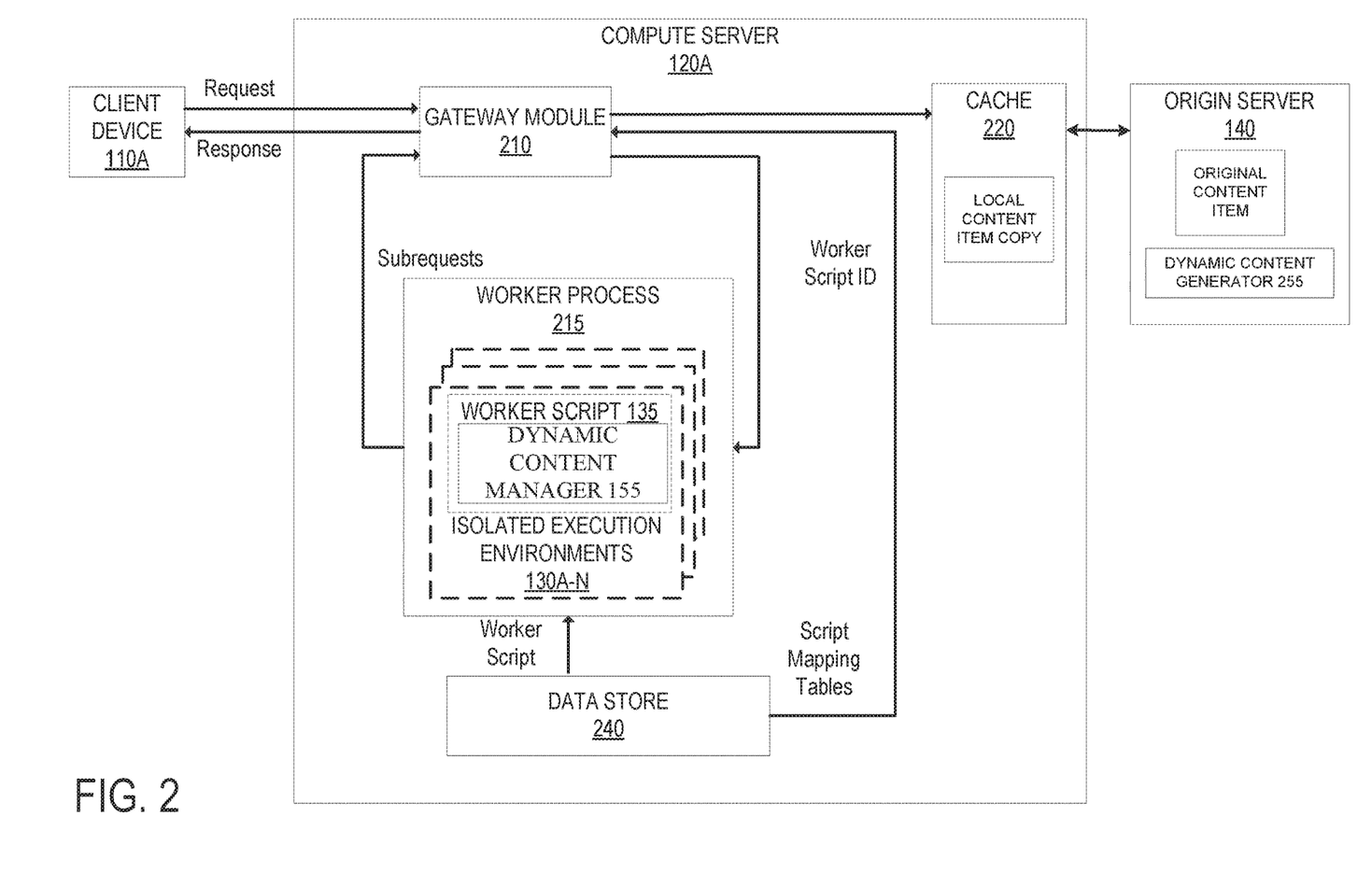
FIG. 2 illustrates an example of a compute server that executes a dynamic content manager according to one embodiment.

FIG. 2 illustrates an example of a compute server 120 according to an embodiment. The compute server 120A includes a gateway module 210, a worker process 215, a cache 220, and a data store 240. The gateway module 210 receives web requests and processes web responses (e.g., HTTP requests and HTTP responses). The gateway module 210 may be acting as a reverse proxy for the origin server 140. The gateway module 210 has access to the cache 220 that is configured to cache network resources (e.g., web pages, images, word processing documents, PDF files movie files, music files, or similar computer files), configuration files, scripts, and/or other content items. The local content items in the cache 220 are copies of identical content items provided by the origin server. The local content items can have dynamic values that are generated by a dynamic content generator 255 at the origin server 140. On the first request for the content item the dynamic value generated by the origin server is valid. However, subsequently, the dynamic value in the local content item cannot be re-used and must be replaced. The data store 240 is configured to store, among other items, the worker scripts such as the dynamic content manager 155 that are received from the control server 130.

Each worker process 215 is a single process that executes the isolated execution environments 130A-N. There may be hundreds to thousands of isolated execution environments that are run simultaneously by the worker process 215. Each different worker script 135, such as the dynamic content manager 155, is run by a different one of the isolated execution environments 130A-N each with its own heap or similar memory structure. The worker process 215 starts an isolated execution environment to load a particular worker script on the first use of the worker script. Depending on the complexity of the worker script, loading the worker script may take approximately tens to hundreds of milliseconds of processor time. A worker script stays loaded in memory between requests so that the worker script can be used to respond quickly when a new request that triggers that worker script arrives. Handling a single request for a worker script that is already loaded typically takes a fraction of a millisecond of processor time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during the booting of the compute server 120A or when the first worker script is triggered for execution.

The gateway module 210 receives a request from the client device 110A. The request may be an HTTP request for a zone of the customer. A zone is a subset of a set of resources of the distributed computing platform. The gateway module 210 processes the request including determining whether the request triggers executing of a worker script such as the dynamic content manager. For instance, the gateway module 210 analyzes a uniform resource locator (URL) in the request against the URL matching pattern configured for the zone to determine if a worker script such as the dynamic content manager is to be executed. If a worker script is to be executed, the gateway module 210 annotates the request with the identifier of the worker script to be executed as determined by a script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates the response after the worker script(s) are executed. If the identified worker script is not loaded, the worker process 215 creates an isolated execution environment and loads and executes the worker script.

The executed worker script can take various actions depending on how the script is written. The worker script may make one or more further requests (referred herein as "subrequests") such as additional HTTP requests. These subrequests may be destined for the origin server 140 or to other destinations on the internet. The worker process 215 sends the subrequests back to the gateway module 210 for further processing. The gateway module 210 is configured to prevent the subrequest from looping back to the same worker script. But, the subrequest may trigger a different worker script potentially from a different zone. If the subrequest is to the same zone, the gateway module 210 transmits the subrequest to the origin server 140 for processing and receives the response from the origin server 140. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. In the embodiments where a dynamic content manager is among the triggered worker scripts, an example scenario is a customer that has a service to provide a complex website with images, forms, scripts, and similar content items. The user of a client device sends an HTTP request for a webpage. The gateway module 210 instantiates worker scripts to retrieve the web pages as well as the related content items. The dynamic content manager 155 is also instantiated. The gateway module checks the local content cache 220 for local copies of the requested content items. Any content item that is not found in the cache 220 causes the gateway module to request those content items from the origin server. The origin server responds to the requests from the gateway module and sub-requests for specific content items. In some embodiments, the dynamic content manager searches each of the content items found in the local cache to identify dynamic values. In some embodiments, the dynamic content manager can also search or alternatively search content items returned from the origin server. If a dynamic value is identified, then the dynamic content manager can determine whether it can generate a replacement dynamic value appropriate to the dynamic value type. In some cases other worker scripts can be invoked that are specific to the type of dynamic values, e.g., a nonce generated can be invoked to generate a nonce value using a random or pseudo-random number generation algorithm or process.

The generated dynamic value (e.g., a nonce value) is written into the content item in place of the existing dynamic value found therein. In some cases, depending on the type of the dynamic value, the same generated dynamic value can be used to replace all similar dynamic values in the content item. In other embodiments, each dynamic value can be separately evaluated and a replacement dynamic value generated to replace it. For sake of clarity and conciseness, the examples described herein generally relate to a content item with a single type or instance of dynamic content. In some embodiments, the dynamic content manager can record the information related to the replacement of the existing dynamic value in a log in the data store or in a similar location. The dynamic content manager can subsequently send updates to the to the control server and notifications of changes to the dynamic values to the customer. The dynamic content manager can identify content items with dynamic values that can be locally generated (i.e., that are 'safe'), such that this evaluation does not have to be re-executed on each request for the content item. In cases where dynamic content cannot be locally generated, then the dynamic content manager can ensure that the content item is re-requested from the origin server.

Figure 3:
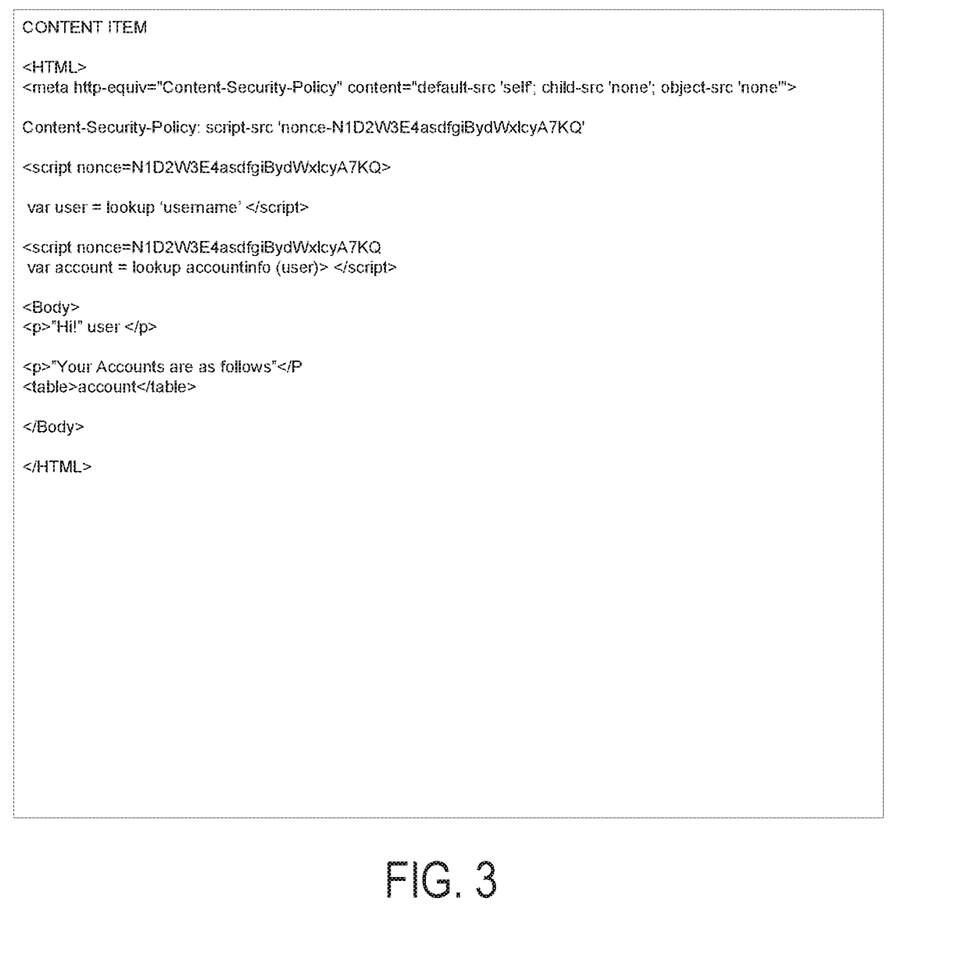
FIG. 3 is an example web page with dynamic content according to one embodiment.

FIG. 3 is a diagram of an example web page with a set of dynamic values. In this example, a basic webpage is shown that utilizes a set of dynamic values. In this example, the webpage presents personalized information for a user that is generated from a generic page or template that is completed with dynamic values such as name and account information. The dynamic values can be utilized in conjunction with CSP. A CSP is defined in the <meta> tag. The CSP can correlate with content items that can include scripts, text and similar content.

In the example web page, a script looks up the name of the user to be inserted into a text greeting for the user in the webpage, e.g., "Hi!"<username>" or similar greeting with dynamic content that replaces the placeholder value <username> shown as a javascript variable 'user' in the illustrated example. Similarly, in the example webpage a table is present that is populated with user specific account information. These dynamic values are user specific and secure. Thus, it is not consistent with the security of these pages to provide a copy of the pages with the user specific dynamic values. However, rather than retrieve a complete new copy of the web page, it is possible to update the dynamic values by the dynamic content manager at the proxy server or the dynamic content origin server to be specific to a requesting user. The dynamic content manager at a proxy server can search a content item to find the dynamic values when there is a subsequent request for the same content item and it is stored in the local cache. In this example, upon detection of the user specific dynamic values, the dynamic content generator can determine equivalent values for the requesting user or request the dynamic values from the origin server.

In this example, the CSP also indicates that the scripts have a specific nonce value (e.g., 'nonce-N1D2W3E4asdfgiBydWxlcyA7KQ). Thus, all legitimate scripts within this web page will contain the same nonce value. The nonce value can be selected by the dynamic content generator (e.g., a nonce generator) at the origin server or at the proxy server and can only be utilized once (i.e., there is a one to one relationship between responses and nonce values). In this example, all of the scripts include the proper nonce value and can be executed at the client device. If the scripts do not include the proper nonce value then they should not be executed. This can occur due to errors in coding or by injection of malicious code into the content item.

A content item that is protected with the CSP should not execute the scripts with missing or incorrect nonce values. A client device can ignore these scripts and can report or log their presences. The dynamic content manager at a proxy server can search a content item to find the nonce values when there is a subsequent request for the same content item and it is stored in the local cache. In this example, only the valid nonce values that match the header nonce value would be updated and replaced. In other embodiments, the dynamic content manager can identify non-matching, missing or improper nonce value information and log or report such content items to bring them to the customer's attention. In some embodiments, the dynamic content manager will not act to interrupt the retrieval of a content item with improper or missing nonce values and functions solely for detection and replacement of valid nonce values. This configuration can be utilized to prevent errors in coding from blocking a legitimate access of data. In other embodiments, the dynamic content manager can block a response from being sent to a requestor where the improper or missing nonce values are found.

Figure 4:
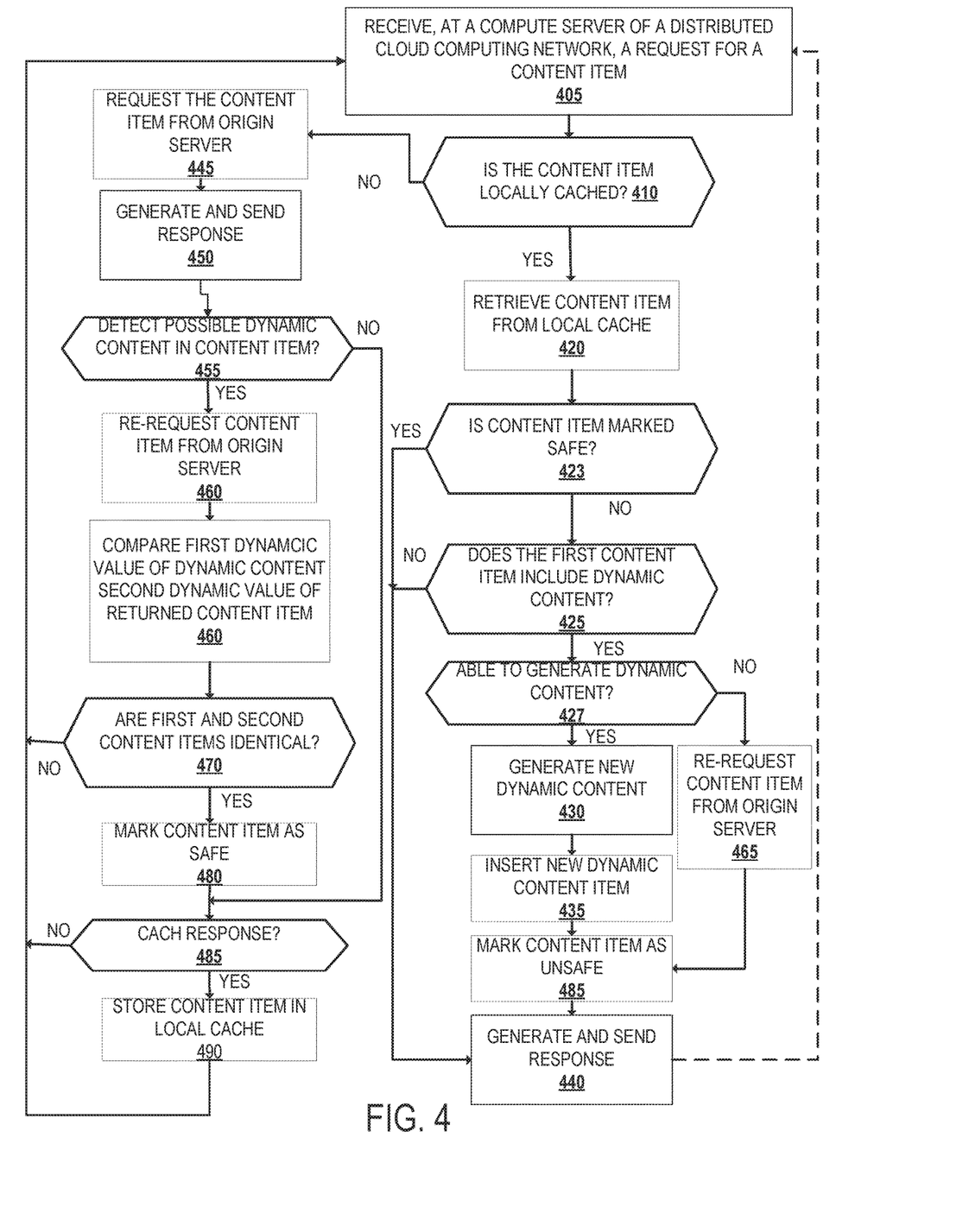
FIG. 4 is a flow diagrams that illustrate exemplary operations for executing a dynamic content manager in a distributed cloud computing network according to an embodiment.

FIG. 4 is flow diagrams that illustrates exemplary operations for executing a dynamic content manager in a distributed cloud computing network according to an embodiment. The operations of FIG. 4 are described with respect to the exemplary embodiment of FIGS. 1 and 2. However, the operations of FIG. 4 can be performed by different embodiments than those of FIGS. 1 and 2, and the embodiment described in FIGS. 1 and 2 can perform operations different than those of FIG. 4. The operations of FIG. 4 will be described with respect to HTTP/S requests and responses. But, the operations of FIG. 4 can be performed with different types of network resource requests and responses. The example operations are provided by way of illustration and not limitation. One skilled in the art would appreciate that other alternate embodiments consistent with the principles and features of these examples are within the scope of the embodiments.

In FIG. 4, at operation 405, a first one of multiple compute servers of a distributed cloud computing network receives a request that triggers execution of a dynamic content manager. The request may be received from a client device and be an HTTP or HTTPS request. The HTTP/S request can be destined for a zone configured to trigger the dynamic content manager. For example, a request can be destined for a zone associated with a customer that has configured a dynamic content manager. The dynamic content manager is one of multiple worker scripts that can be executed by the first compute server in response to the request. The dynamic content manager may be a first-party or third-party code piece (written and/or provided by an owner or operator of the zone). The dynamic content manager can be, for example, a piece of JavaScript or other dynamically-typed language, a WASM compiled piece of code, or other compiled code. The first compute server may determine that the request triggers execution of the dynamic content manager by matching the zone to a predetermined matching pattern that associates the dynamic content manager to the predetermined matching pattern. For instance, the compute server may analyze a URL identified in a received HTTP request against a URL matching pattern configured for the zone to determine if a working script is to be executed and if so, which working script, e.g., the dynamic content manager. With respect to FIG. 1, the compute server 120A receives a request from the client device 120A that triggers execution of a working script such as the dynamic content manager. In one example, the HTTP request is an HTTP GET method for "example.com," which matches a predefined matching pattern to apply to a dynamic content manager that searches for dynamic content markers specific to example.com domain.

The distributed cloud computing network includes multiple compute servers including the first compute server. The compute servers are geographically distributed. There may be hundreds or more compute servers. In an embodiment, each of the compute servers are anycasted to a same IP address, and the first compute server receives the request in operation 405 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to it.

In an embodiment, each of the compute servers of the distributed cloud computing network includes the working scripts such as the dynamic content manager. The dynamic content manager code can be deployed to each of the compute servers without the owner or operator of the zone selecting which of the compute servers are to receive and potentially run the dynamic content manager. In an alternative embodiment, the owner or operator of the zone selects which of the compute servers are to receive and potentially run the dynamic content manager.

The gateway module causes the execution of the dynamic content manager in a first isolated execution environment. Multiple other working scripts can also be started by the gateway module and executed by the single process in multiple other isolated execution environments respectively. Code of a working script in one isolated execution environment cannot interfere with code running in a different execution environment despite being in the same process. The dynamic content manager code can be triggered to execute for different zones and different customers. The isolated execution environment is managed in user-space rather than by an operating system. Data cannot be shared or moved across isolated execution environments (each isolated execution environment has a completely separate state). The single process on the compute server can run multiple isolated execution environments (e.g., hundreds to thousands) seamlessly switching between them. Each isolated execution environment uses its own mechanism to ensure safe memory access, such as preventing the code from requesting access to arbitrary memory (restricting its use to the objects it has been given) and/or interpreting pointers within a private address space that is a subset of an overall address space. In a specific implementation, the working scripts such as the dynamic content manager code is run in an isolate of the V8 JavaScript engine.

In an embodiment, the dynamic content manager code is loaded and executed on-demand (when and only if it is triggered to execute). That is, the dynamic content manager code will not be loaded into memory until and unless a request triggers it for execution. The dynamic content manager code stays loaded in memory (at least for a certain amount of time) between requests so that the dynamic content manager code can be used to respond quickly if a new request is received that triggers execution of that same dynamic content manager. An eviction process may evict working scripts such as the dynamic content manager in a least recently used fashion. If the dynamic content manager is not already loaded in memory and/or an isolated execution environment is not running in which to execute the dynamic content manager, an isolated execution environment is created, and/or the dynamic content manager is loaded to memory. Loading the dynamic content manager code may take approximately tens to hundreds of milliseconds of processor time.

At operation 405, the execution of the dynamic content manager and other working scripts that are processing a request may cause a set of sub-requests to be generated to retrieve each of the content items that are a part of a requested network resource. A subrequest is an additional request such as an additional HTTP request. The subrequest can be destined for the origin server of the zone or can be destined to a different server on the internet. If the subrequest is for the zone, the first compute server is configured to prevent the subrequest from looping back to the same first piece of code. Instead, the first compute server transmits the subrequest to the origin server for processing. Each subrequest will cause a separate response to be sent to the compute server. For example, where a web page is identified in an initial HTTP GET request, a set of sub-requests to retrieve additional content items such as images and scripts that are associated with the requested web page can be generated.

If the subrequest is for a different zone than that handled by the first compute server (e.g., a DNS request for an address record of the different zone returns an anycasted IP address of the compute servers), the subrequest can be processed by the first compute server directly (without the subrequest being transmitted to another compute server, for example). Processing of this subrequest may trigger a different working script, e.g., a separate dynamic content manager or helping functions such as a nonce generator, to be executed. If the subrequest is for a different zone that is not handled by the first compute server (e.g., a DNS request for an address record of the different zone does not return an IP address of the first compute server), the compute server transmits the subrequest to that different server. In an embodiment, a dynamic content manager can be limited to handling a predefined number of subrequests. A header stores a number that counts the number of subrequests and if it exceeds the limit, the subrequest will not be processed. Additional sub-requests can be handled by initiating another dynamic content manager.

At operation 410, the dynamic content manager of the first compute server determines whether network resources requested are locally cached or cached in the set of compute servers. If the requested network resources are not locally cached, then at operation 445, the content item is requested from the origin server and then at operation 450 is returned to the requesting client device. In parallel with sending the response and/or after the response is sent, the dynamic content manager can check the content item to identify dynamic content at operation 455. The dynamic content can be identified by explicit tags or markers in the content item or by matching with a data type or pattern. If no dynamic content is found, then a determination can be made whether to cache the content item at operation 485. Any criteria can be applied to identify the content items to cache. If the content item is cached at operation 490 or if a determination not to cache the content item is made, then the process can complete and await further requests at operation 405. If dynamic content is found then the dynamic content manager can re-request the content item from the origin server at operation 460 to enable the two copies of the content item to be compared. When the second copy of the content item is received from the origin server, dynamic content manager can compare the first copy and the second copy of the content item to confirm that the dynamic content has changed. In some embodiments, the content items are compared by hashing each copy and comparing the hash value. If the hash values are the same then the two copies are considered to be identical. In some embodiments, the specific (e.g., of the dynamic values) changes are analyzed to further determine the type of the dynamic content and whether a local function can perform an update of the dynamic values. If the two copies are not determined to be identical at operation 470, then the process can bypass storing the content item in the local cache and await a next request for a content item to be processed at operation 405. In other embodiments, the content item can be cached but can be marked as including dynamic content that can be re-requested from the origin server. Where the first and second copies of the content item are identical, then it can be confirmed to be safe and marked as safe at operation 480. The content item can then be determined whether to be cached in the local cache based on any other relevant criteria (e.g., available space in the local cache) at operation 485. If the content item is to be cached, then the content item is stored in the local cache along with the safe designation at operation 490. The tracking of safe items can be within the local cache or in a separate data structure.

In cases where a request for network resources is received and the network resources are locally cached, the dynamic content manager retrieves the requested content items from the local cache at operation 420. Since the availability in the local cache indicates a prior access of the content item any dynamic values therein are not valid for the subsequent access. At operation 423, the dynamic content manager determines whether a requested content item is marked as safe. The tracking of safe content items can be based on metadata stored with the content items in the local cache, tracking of safe content items in a separate data structure or using a similar mechanism. If the content item is marked as safe, then at operation 440 a response can be generated to return the requested content item.

If the content item is not marked as safe, then the dynamic content manager searches the content item retrieved from the local cache at operation 425. The content items can be any type of file including text, HTML, script, video, image, audio file, or similar types of content items. As each of the local content items is retrieved the dynamic content manager analyzes or searches the content item to identify any dynamic values that are embedded therein. If no dynamic values are found, then the process completes by the generation and sending of a response with the requested content items of a requested network resource including the locally cached content items at operation 440. The process can then continue to await the retrieval of the next request for a network resource and associated content items. In other embodiments, the dynamic content manager completes its process and is restarted when another request is received.

If any locally cached content items are found to include a dynamic value, then a check is made whether the process can generate a new dynamic value at operation 427 using any available functions or processes including other worker scripts. For example, if the dynamic content is a nonce value, then a nonce generator can be invoked to generate random or pseudo-random nonce values. If new dynamic content can be generated, then the dynamic content is generated by the helping function or worker script at operation 430. The dynamic value can be any type, size or number of values including both numeric and non-numeric values. In some embodiments, information about the existing and replacement dynamic value can be logged. Similarly, any improper or missing dynamic value information can be logged. The logged information can include any information about the request and the content items that included the improper or missing dynamic value. This information can be logged locally in a log and/or can be reported to a centralized or remote logging system at the control system or similar location. In some embodiments, the recording of the improper dynamic value or missing dynamic information triggers a notification to a customer or administrator associated with the origin server from which the content item was initially retrieved. In other embodiments, a separate notification is not sent and the customer can inspect the logs to review the logged information. In some embodiments, the process can generate a replacement response to take the place of a response with scripts or similar content items with improper dynamic value information removed. The replacement response can be an error message or can return alternate content to mask the detection of the improper dynamic values.

After a new dynamic value is generated, the new dynamic value is inserted in place of the old or existing dynamic value in the content item at each location where it occurs in the content item at operation 435. The content item in the cache that has had its value replaced can be marked as unsafe in a tracking data structure or in the local cache. The content item with the updated dynamic values can then be sent to the client device in a response generated for the client device request at operation 440. The process of the dynamic content manager can be triggered again at any time by further requests at operation 405 either in a polling mechanism or a triggering mechanism.

In case where the dynamic content manager assess that it is not possible to generate replacement dynamic content at operation 427, then the dynamic content manager re-requests the content item from the origin server 465. When a new copy of the content item is received, then it can be stored in the local cache and marked as unsafe at operation 485. In other embodiments, all copies of the content item can be purged from the local cache and tracked as unsafe. The new copy of the content item is used to generate and send a response to the client device at operation 440. The process can then await further requests at operation 405.

Running deployed code such as a dynamic content manager in isolated execution environments improves the performance as compared with running code using a virtual machine or a container. Unlike other computing platforms that instantiate a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches.

Figure 5:
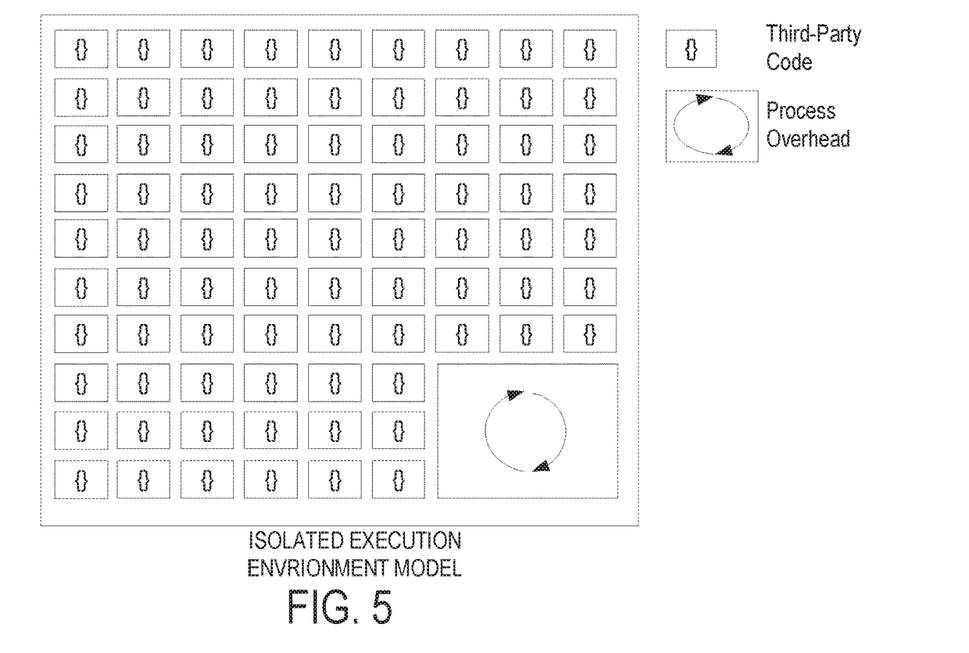
FIG. 5 is a conceptual figure that shows a conceptual relationship between deployed code and the process overhead of the isolated execution environment model that is described in the embodiments.

FIG. 5 is a conceptual figure that shows a conceptual relationship between deployed code and the process overhead of the isolated execution environment model that is described in embodiments herein. As shown, the isolated execution environment can include any number of deployed codes being managed as a set with a single process overhead. The deployed codes can be worker scripts such as the dynamic content manager or similar code.

Figure 6:
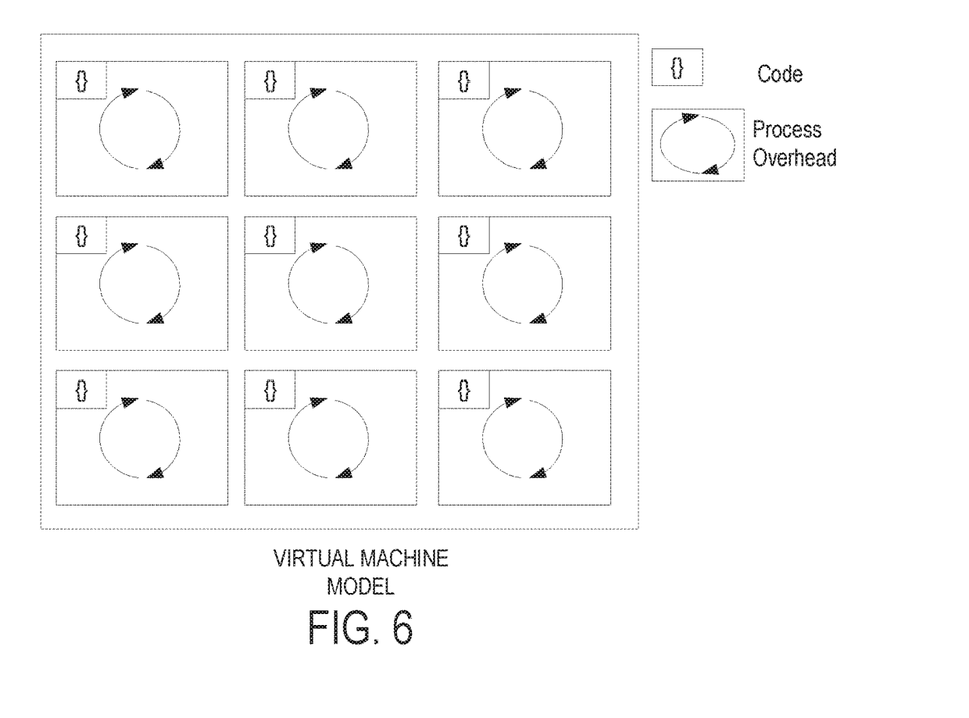
FIG. 6 is a conceptual figure that shows a conceptual relationship between code and the process overhead of a virtual machine model.

FIG. 6 is a conceptual figure that shows a conceptual relationship between code and the process overhead of a virtual machine model by way of comparison. As seen in FIGS. 5 and 6, the process overhead of the virtual machine model is experienced for each different code executed (a new process has to be started for each different code piece), whereas the process overhead of the isolated execution environment model is experienced once.

Figure 7:
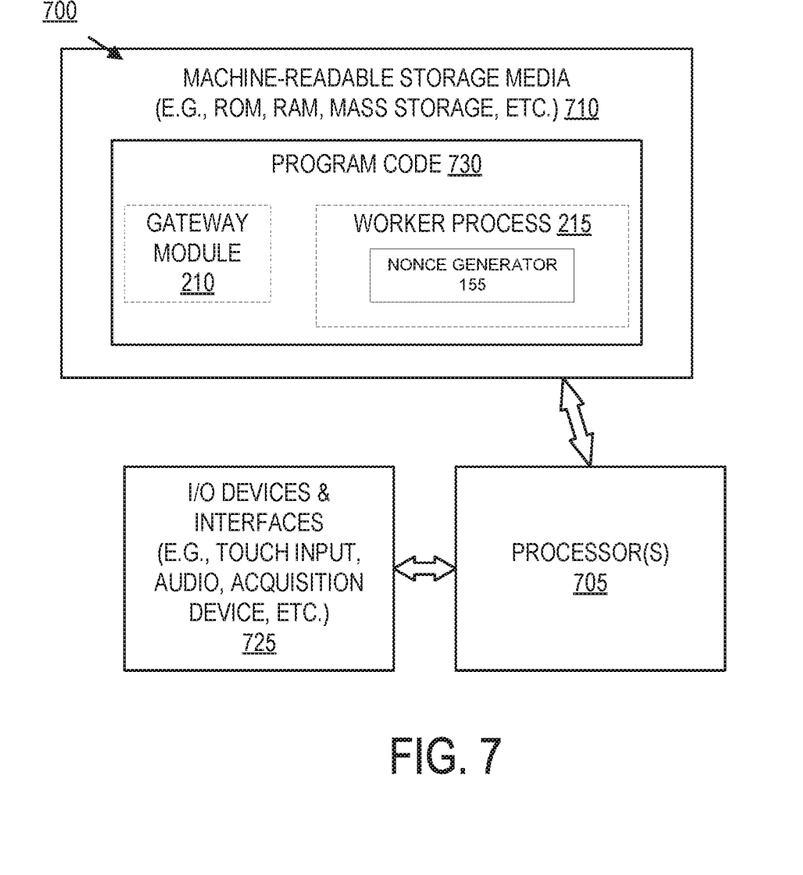
FIG. 7 illustrates a block diagram for an exemplary data processing system that may be used in some embodiments.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the compute server, control server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the gateway module 210 and/or the worker process(es) 215 including dynamic content manager 155 as described herein.

The data processing system 700 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the compute server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a first compute server of a plurality of compute servers, a request from a client device, where the plurality of compute servers are part of a distributed cloud computing platform, and wherein the request is a request for a network resource composed of a plurality of content items;
   executing, by a single process at the first compute server, a dynamic content manager, wherein the dynamic content manager is run in a one of a plurality of isolated execution environments;
   locating at least one content item from the plurality of content items in response to the request for the network resource;
   detecting possible dynamic content in the at least one content item;
   comparing a first dynamic value in a first copy of the at least one content item to a second dynamic value in a second copy of the at least one content item from an origin server; and
   storing the at least one content item in a local cache as a safe content item to be returned for subsequent requests of the at least one content item in response to the first dynamic value matching the second dynamic value.

2. The method of claim 1, further comprising:
   marking the first content item as safe in the local cache or in a tracking data structure in response to the first dynamic value matching the second dynamic value.

3. The method of claim 1, further comprising:
   requesting the second copy of the at least one content item from the origin server remote from the first compute server in response to detecting the possible dynamic content.

4. The method of claim 1, wherein the first content item is located in the local cache, further comprising:
   determining whether the at least one content item is marked as safe in the local cache or in a tracking data structure.

5. The method of claim 1, further comprising:
   determining whether the dynamic content can be replaced at the first compute server.

6. The method of claim 1, wherein the first dynamic value is any one or more of a nonce, text string, image or a numeric value that changes in each response to a request for the content item from the origin server.

7. The method of claim 1, further comprising:
   marking the at least one content item as unsafe in the local cache or flushing the at least one content item from the local cache in response to confirming dynamic content is present in the at least one content item.

8. A non-transitory machine-readable storage medium of a first one of a plurality of compute servers that provides instructions that, when executed by a processor, cause the processor to perform operations comprising:
   receiving, at a first compute server of a plurality of compute servers, a request from a client device, where the plurality of compute servers are part of a distributed cloud computing platform, and wherein the request is a request for a network resource composed of a plurality of content items;

executing, by a single process at the first compute server, a dynamic content manager, wherein the dynamic content manager is run in a one of a plurality of isolated execution environments;

locating at least one content item from the plurality of content items in response to the request for the network resource;

detecting possible dynamic content in the at least one content item;

comparing a first dynamic value in a first copy of the at least one content item to a second dynamic value in a second copy of the at least one content item from an origin server; and storing the at least one content item in a local cache as a safe content item to be returned for subsequent requests of the at least one content item in response to the first dynamic value matching the second dynamic value.

9. The non-transitory machine-readable storage medium of claim 8, further providing instructions comprising:
marking the first content item as safe in the local cache or in a tracking data structure in response to the first dynamic value matching the second dynamic value.

10. The non-transitory machine-readable storage medium of claim 8, further providing instructions comprising:
requesting the second copy of the at least one content item from an origin server remote from the first compute server in response to detecting the possible dynamic content.

11. The non-transitory machine-readable storage medium of claim 8, wherein the first content item is located in the local cache, the instructions further comprising:
determining whether the at least one content item is marked as safe in the local cache or in a tracking data structure.

12. The non-transitory machine-readable storage medium of claim 8, further providing instructions comprising:
determining whether the dynamic content can be replaced at the first compute server.

13. The non-transitory machine-readable storage medium of claim 8, wherein the first dynamic value is any one or more of a nonce, text string, image or a numeric value that changes in each response to a request for the content item from the origin server.

14. The non-transitory machine-readable storage medium of claim 8, further providing instructions comprising:
marking the at least one content item as unsafe in the local cache or flushing the at least one content item from the local cache in response to confirming dynamic content is present in the at least one content item.

15. A compute server, comprising:
a set of one or more processors; and
a non-transitory machine-readable storage medium that provides instructions that, when executed by the set of processors, cause the set of processors to perform the following operations:

receiving, at a first compute server of a plurality of compute servers, a request from a client device, where the plurality of compute servers are part of a distributed cloud computing platform, and wherein the request is a request for a network resource composed of a plurality of content items;

executing, by a single process at the first compute server, a dynamic content manager, wherein the dynamic content manager is run in a one of a plurality of isolated execution environments;

locating at least one content item from the plurality of content items in response to the request for the network resource;

detecting possible dynamic content in the at least one content item;

comparing a first dynamic value in a first copy of the at least one content item to a second dynamic value in a second copy of the at least one content item from an origin server; and storing the at least one content item in a local cache as a safe content item to be returned for subsequent requests of the at least one content item in response to the first dynamic value matching the second dynamic value.

16. The compute server of claim 15, wherein the operations are further comprising:
marking the first content item as safe in the local cache or in a tracking data structure in response to the first dynamic value matching the second dynamic value.

17. The compute server of claim 15, wherein the operations are further comprising:
requesting the second copy of the at least one content item from an origin server remote from the first compute server in response to detecting the possible dynamic content.

18. The compute server of claim 15, wherein the operations are further comprising:
determining whether the at least one content item is marked as safe in the local cache or in a tracking data structure.

19. The compute server of claim 15, wherein the operations are further comprising:
determining whether the dynamic content can be replaced at the first compute server.

20. The compute server of claim 15, wherein the first dynamic value is any one or more of a nonce, text string, image or a numeric value that changes in each response to a request for the content item from the origin server.

21. The compute server of claim 15, wherein the operations are further comprising:
marking the at least one content item as unsafe in the local cache or flushing the at least one content item from the local cache in response to confirming dynamic content is present in the at least one content item.

* * * * *